(12) United States Patent
Rhoads et al.

(10) Patent No.: US 8,695,220 B2
(45) Date of Patent: Apr. 15, 2014

(54) HAND-HELD FOOD CUTTER WITH SHAPE IMPARTING DEVICE

(75) Inventors: Bobbie Rhoads, Westport, CT (US); Edward Rhoads, Westport, CT (US)

(73) Assignee: Funbites LLC, Westport, CT (US)

( * ) Notice: Subject to any disclaimer, the term of this patent is extended or adjusted under 35 U.S.C. 154(b) by 229 days.

(21) Appl. No.: 13/156,539

(22) Filed: Jun. 9, 2011

(65) Prior Publication Data
US 2012/0311874 A1 Dec. 13, 2012

(51) Int. Cl.
*A21C 15/04* (2006.01)

(52) U.S. Cl.
USPC .................................. 30/114; 30/299; 30/303

(58) Field of Classification Search
USPC ........... 30/130, 294, 299, 301–303, 312–316, 30/113.1–114; 83/932, 857; D7/673
See application file for complete search history.

(56) References Cited

U.S. PATENT DOCUMENTS

| | | | | |
|---|---|---|---|---|
| 506,340 A * | 10/1893 | Scales | | 30/113.1 |
| 511,803 A * | 1/1894 | Scales | | 30/113.1 |
| 625,636 A * | 5/1899 | Bass et al. | | 30/130 |
| 921,917 A * | 5/1909 | Troxell | | 30/113.3 |
| 944,089 A * | 12/1909 | Greene | | 30/113.3 |
| 1,175,512 A * | 3/1916 | Flemal | | 30/303 |
| 1,364,863 A * | 1/1921 | Buchtel | | 30/303 |
| 1,446,767 A * | 2/1923 | Price | | 30/303 |
| 1,656,415 A * | 1/1928 | Breitkrentz | | 83/620 |
| 1,744,422 A * | 1/1930 | Taylor | | 30/302 |
| D85,385 S * | 10/1931 | Lowitz | | D7/673 |
| 1,864,147 A * | 6/1932 | Rantine | | 30/303 |
| 1,962,737 A * | 6/1934 | Gutmann | | 30/173 |
| D114,471 S * | 4/1939 | Rosenberg | | D7/673 |
| D131,454 S * | 3/1942 | Eggleston | | D7/673 |
| 2,314,401 A * | 3/1943 | Johnson | | 30/130 |
| D149,622 S * | 5/1948 | Dougherty | | D7/673 |
| 2,463,167 A * | 3/1949 | Ghisletta | | D7/673 |
| D154,071 S * | 6/1949 | Smith | | D7/673 |
| 2,502,157 A * | 3/1950 | Klejna | | D7/673 |
| 2,618,852 A * | 11/1952 | Clough | | D7/673 |
| 2,680,907 A * | 6/1954 | Palosaari | | 30/302 |
| 2,720,176 A * | 10/1955 | Babbitt | | 30/130 |

(Continued)

FOREIGN PATENT DOCUMENTS

| | | | | |
|---|---|---|---|---|
| EP | 2277673 | | 1/2011 | |
| EP | 2277673 A1 * | | 1/2011 | ............... B26D 3/18 |

(Continued)

OTHER PUBLICATIONS

FUNBITES®, 2011, http://www.funbites.com/.*

*Primary Examiner* — Jason Daniel Prone
(74) *Attorney, Agent, or Firm* — Leason Ellis LLP

(57) ABSTRACT

A device for cutting food into bite-sized portions includes a first component that includes a base section having a plurality of individual, separate food-receiving slots that are defined by a plurality of walls and are open at both ends thereof. At least some of the walls have arcuate shaped bottom edges. The first component further includes a handle that extends beyond the base section for grasping. Each food receiving slot is formed to have a predetermined shape. The device also includes a second component, separate from the first component, that includes a plurality of fingers that have closed bottom ends. The fingers are sized and shaped to be received within the individual, separate food-receiving slots for ejecting food that is contained in the food receiving slots.

14 Claims, 14 Drawing Sheets

(56) References Cited

U.S. PATENT DOCUMENTS

| | | | | |
|---|---|---|---|---|
| 2,797,478 A | * | 7/1957 | Gebhart et al. | 30/272.1 |
| 2,813,335 A | * | 11/1957 | Ritter | D7/673 |
| 2,983,233 A | * | 5/1961 | Herrington | 30/316 |
| 3,132,423 A | * | 5/1964 | De Lano | 30/114 |
| 3,234,895 A | * | 2/1966 | Leiby | 425/183 |
| D234,038 S | * | 1/1975 | Price | 30/130 |
| 4,137,807 A | * | 2/1979 | Schaumberg | 83/599 |
| D260,841 S | * | 9/1981 | Gilmore | D7/673 |
| 4,572,444 A | | 2/1986 | Shadduck | |
| 4,573,384 A | * | 3/1986 | Jones | 83/404.3 |
| 4,606,716 A | * | 8/1986 | McCaffrey | 30/130 |
| D287,452 S | * | 12/1986 | Stern | D7/673 |
| 4,625,404 A | * | 12/1986 | Valente et al. | 30/303 |
| 4,681,000 A | * | 7/1987 | Wolters | 83/862 |
| 4,843,716 A | * | 7/1989 | Lutzker | 30/130 |
| D305,593 S | * | 1/1990 | Saliba | D7/673 |
| D305,594 S | * | 1/1990 | Saliba | D7/673 |
| 5,193,279 A | * | 3/1993 | Pierce | 30/315 |
| 5,303,473 A | * | 4/1994 | Sadler | 30/128 |
| D356,718 S | * | 3/1995 | Johannessen | D7/673 |
| D375,661 S | * | 11/1996 | Ross et al. | D7/673 |
| D400,766 S | * | 11/1998 | Ferguson | D7/673 |
| D401,813 S | * | 12/1998 | Johnson et al. | D7/673 |
| D409,054 S | * | 5/1999 | Wirfel | D7/673 |
| D413,771 S | * | 9/1999 | So | D7/673 |
| 5,960,548 A | * | 10/1999 | Eldridge | 30/299 |
| D416,177 S | * | 11/1999 | Hood | D7/673 |
| D432,874 S | * | 10/2000 | Kari | D7/673 |
| 6,209,439 B1 | * | 4/2001 | Repac et al. | 83/858 |
| D446,088 S | * | 8/2001 | Pardee | D7/673 |
| 6,276,918 B1 | * | 8/2001 | Slaughter et al. | 30/303 |
| 6,401,605 B1 | * | 6/2002 | Repac et al. | 99/538 |
| D473,109 S | * | 4/2003 | Birchansky | D7/673 |
| 6,604,454 B1 | * | 8/2003 | Tateno | 99/510 |
| D487,000 S | * | 2/2004 | Sarihan | D7/673 |
| D501,371 S | * | 2/2005 | Lo | D7/673 |
| D508,383 S | * | 8/2005 | Endres et al. | D7/673 |
| D547,620 S | * | 7/2007 | Walzak et al. | D7/673 |
| 7,444,909 B2 | * | 11/2008 | Repac et al. | 83/167 |
| D586,189 S | * | 2/2009 | Austin | D7/673 |
| 7,568,414 B2 | * | 8/2009 | Farid et al. | 83/435.19 |
| D611,779 S | * | 3/2010 | Campbell | D7/673 |
| 7,779,739 B2 | * | 8/2010 | Peterson et al. | 83/858 |
| D634,590 S | * | 3/2011 | Ferguson | D7/673 |
| D638,666 S | * | 5/2011 | Seehoff et al. | D7/673 |
| D639,121 S | * | 6/2011 | Jowett | D7/673 |
| D648,989 S | * | 11/2011 | Coursey et al. | D7/673 |
| D649,413 S | * | 11/2011 | Coursey et al. | D7/673 |
| 8,046,921 B2 | * | 11/2011 | Mastroianni | 30/113.2 |
| D650,246 S | * | 12/2011 | Harris et al. | D7/673 |
| D650,247 S | * | 12/2011 | Harris et al. | D7/673 |
| 8,230,604 B1 | * | 7/2012 | Corey et al. | 30/358 |
| D687,267 S | * | 8/2013 | Harris et al. | D7/673 |
| D690,170 S | * | 9/2013 | Harris et al. | D7/673 |
| 2004/0211069 A1 | * | 10/2004 | Tuttle | 30/302 |
| 2005/0229405 A1 | * | 10/2005 | Endres et al. | 30/305 |
| 2008/0168660 A1 | * | 7/2008 | Chiu | 30/114 |
| 2008/0271321 A1 | * | 11/2008 | Brunner et al. | 30/113.1 |
| 2009/0100687 A1 | | 4/2009 | Mills | |
| 2009/0205514 A1 | * | 8/2009 | Cheng | 83/857 |
| 2009/0266246 A1 | * | 10/2009 | Hood | 30/113.1 |
| 2009/0282990 A1 | * | 11/2009 | Farnum et al. | 99/537 |
| 2010/0180452 A1 | * | 7/2010 | Mucci | 30/314 |
| 2011/0283548 A1 | * | 11/2011 | White | 30/301 |
| 2012/0102760 A1 | * | 5/2012 | Hauser | 30/302 |

FOREIGN PATENT DOCUMENTS

| | | |
|---|---|---|
| JP | 3162904 | 9/2010 |
| WO | WO 2012170487 A2 * | 12/2012 |
| WO | WO 2012170487 A3 * | 2/2013 |

* cited by examiner

HAND-HELD FOOD CUTTER WITH SHAPE IMPARTING DEVICE

TECHNICAL FIELD

The present invention relates to a cutting implement and in particular, to a hand-held food cutter with shape imparting device that cuts food into fun shaped bite-sized pieces.

BACKGROUND

Mealtime can be not a lot of fun and even stressful for parents/caregivers and children. Parents want children to eat food that is good for them and to try new things but this can be time-consuming and frustrating. Everyone is so busy. Frozen food, fast food and junk food that is often available in fun bite-sized shapes surround us and entice children. To get children to eat good food, parents often spend so much time cutting food into bite-sized pieces so it is easier and more appealing to eat. Still, children pick and choose what they want—not always choosing the most nutritious food, but rather the most fun looking food.

In addition, obesity has become a national epidemic, especially among children. This is in part due to an unhealthy change in children's diets in the past years as well as children becoming less active. There is a need to address this growing epidemic and to offer a practical simple solution to a growing problem and to change how parents and children look at mealtime overall. This present invention provides a product that is designed to help parents and caregivers counter the growing problem, help promote healthier eating in children and make mealtime less stressful and more fun for all concerned.

SUMMARY

In accordance with the present invention, a device for cutting food into bite-sized pieces includes a first component that includes a base section having a plurality of individual, separate food-receiving slots that are defined by a plurality of walls and are open at both ends thereof. At least some of the walls have arcuate shaped bottom edges. The first component further includes a handle that extends beyond the base section for grasping. Each food receiving slot is formed to have a predetermined shape. The device also includes a second component, separate from the first component, that includes a plurality of fingers that have closed bottom ends. The fingers are sized and shaped to be received within the individual, separate food-receiving slots for ejecting food that is contained in the food receiving slots.

These and other aspects, features and advantages shall be apparent from the accompanying drawings and description of certain embodiments of the invention.

DETAILED DESCRIPTION OF CERTAIN EMBODIMENTS OF THE INVENTION

Figure 1:
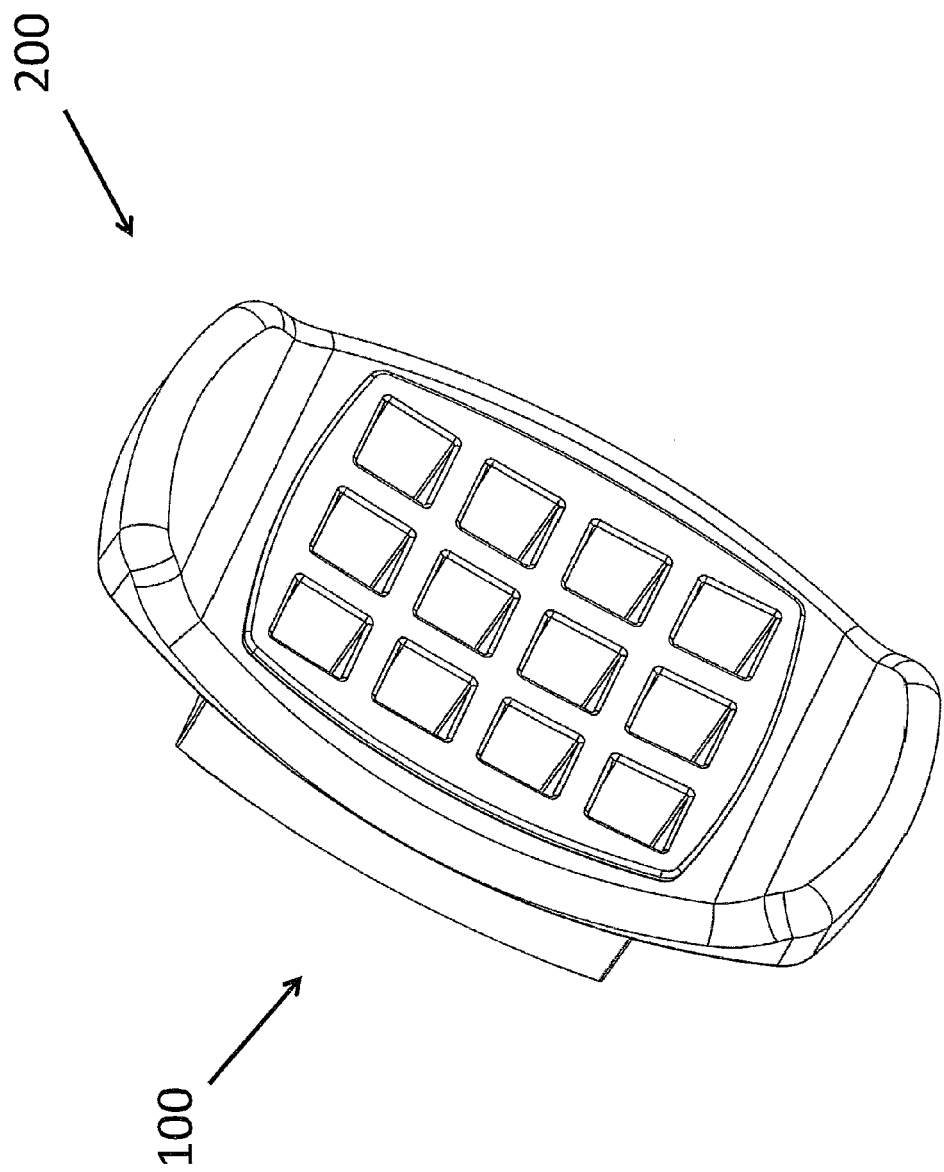
FIG. 1 is a top and side perspective view of a food cutter device according to one embodiment in an assembled state.

FIG. 1 illustrates one product or device 100 in accordance with the present invention. The device 100 is designed to make mealtime simpler and more fun for parents/caregivers and children. In other words, by making the eating of healthy food more of a fun and enjoyable experience, the odds increase that the child will try new food, eat healthier food and will hopefully cultivate a taste for such healthier food over time.

The device 100 is designed to cut or partition a food into smaller portions "fun bites" that are more enticing to children. Thus, the device 100 can be thought of as at least in part as being a food cutter that easily cuts food into predetermined bite-sized shapes.

The device 100 includes a first component or part 200 that functions as a food cutter and as described herein is designed to cut food into a plurality of bite-sized portions and a second component or part 300 that acts as pusher and discharges the bite-sized portions that are cut and collected in the first part 200.

The first component 200 is preferably a single, integral structure, such as a molded plastic article that can be formed in any number of different colors. The first component generally includes a first face (outer surface) 202 that faces away from the food to be cut; an opposite second face (inner surface) 204 that faces the food to be cut; a first end 206; and an opposing second end 208. The first component 200 has a base section 210 that acts as a cutting and collection member and a handle section 201 that extends outwardly from the base section 210.

The base section 210 is substantially hollow and includes a plurality of food receiving slots 220 that are formed to have a predetermined shape. The base section 210 is defined by a pair of side walls 222 and a pair of end walls 224 and in the illustrated embodiment, these walls 222, 224 define a box-like structure with the slots 220 being located therebetween. The slots 220 are also formed by one or more intermediate walls 230 that intersect the pair of side walls 222 or the pair of end walls 224. For example, in the embodiment shown in FIG. 4, there are five intermediate walls 230 that define the 12 food receiving slots 220. More specifically, there are two intermediate wall 230 that extends between the end walls 224 and there are three intermediate walls 230, spaced from one another, that extend between the side walls 222 to form the grid-like pattern.

The walls 222, 224, 230 can be thought of as being blades and the slots 220 define individual spaces that receive the segmented (cut) food. The slots 220 have a height and there can accommodate a tall segmented portion of food.

In accordance with the present invention, each of the side walls 222, end walls 224 and intermediate walls 230 includes a cutting element 250 that is formed as a part thereof and is located along the second face 204. The cutting elements 250 can be tapered bottom edges of the respective walls or otherwise sharpened edges.

Figure 5:
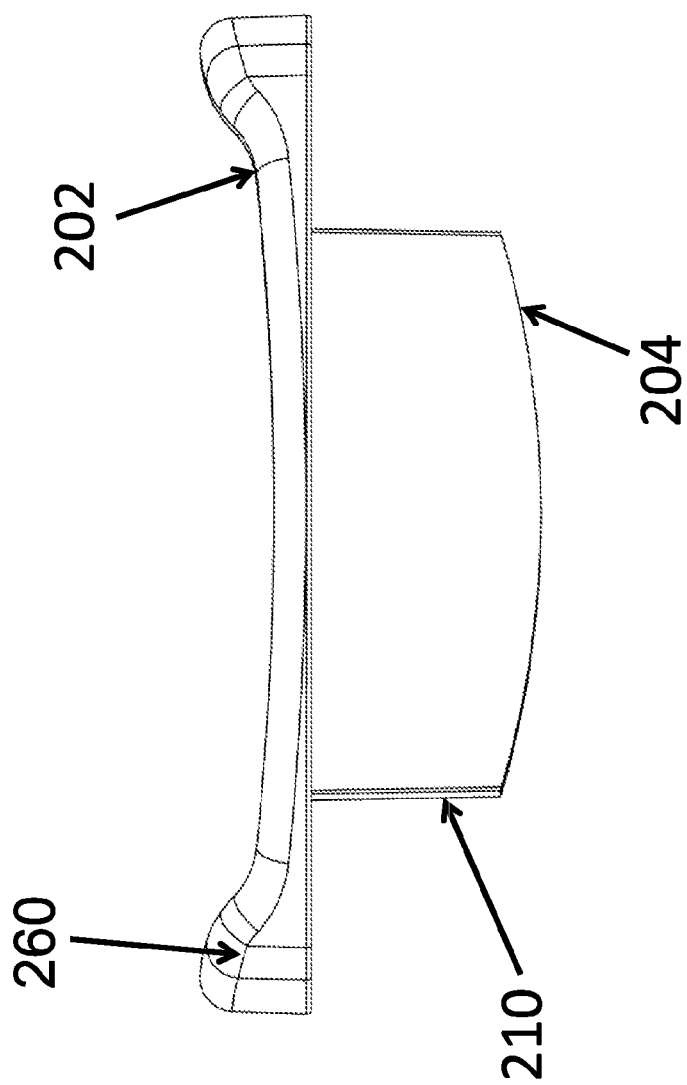
FIG. 5 is a side elevation view the first part.
Figure 6:
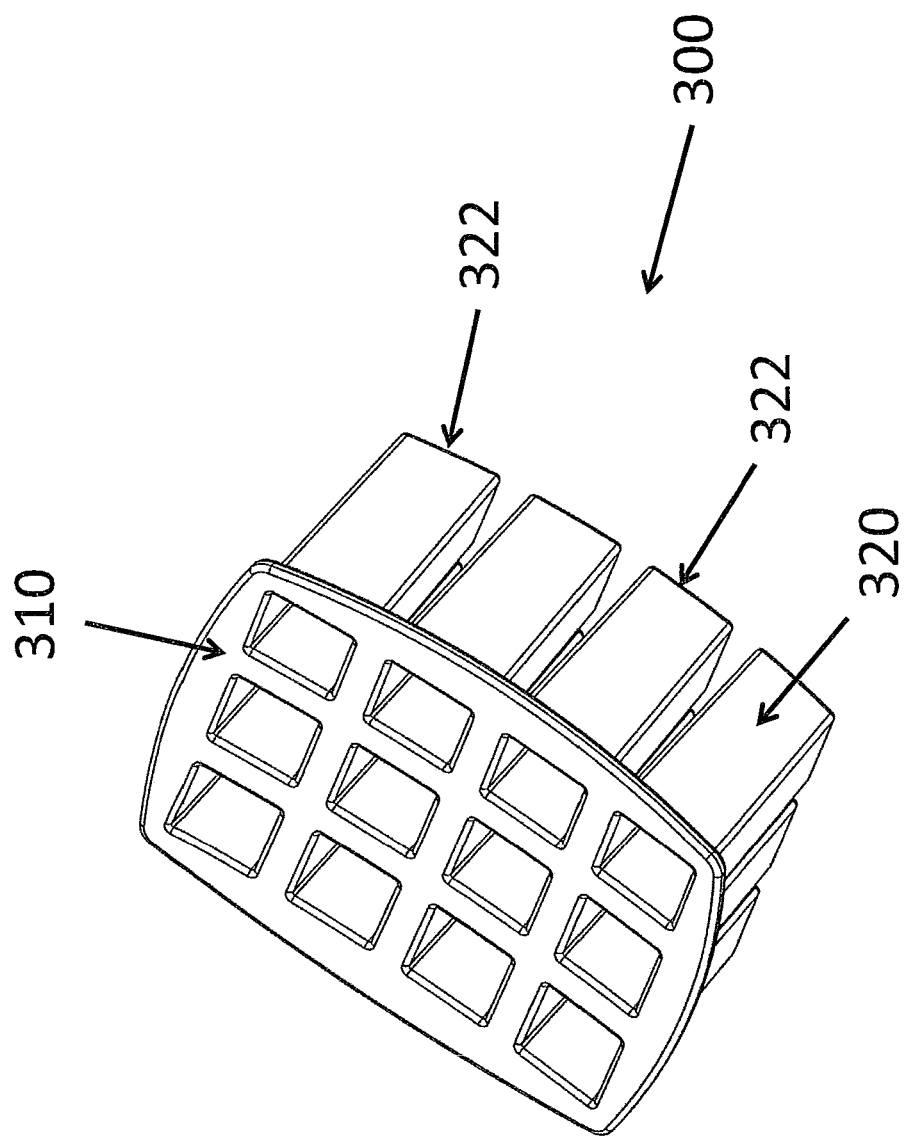
FIG. 6 is a top and side perspective view of a second part of the device.
Figure 7:
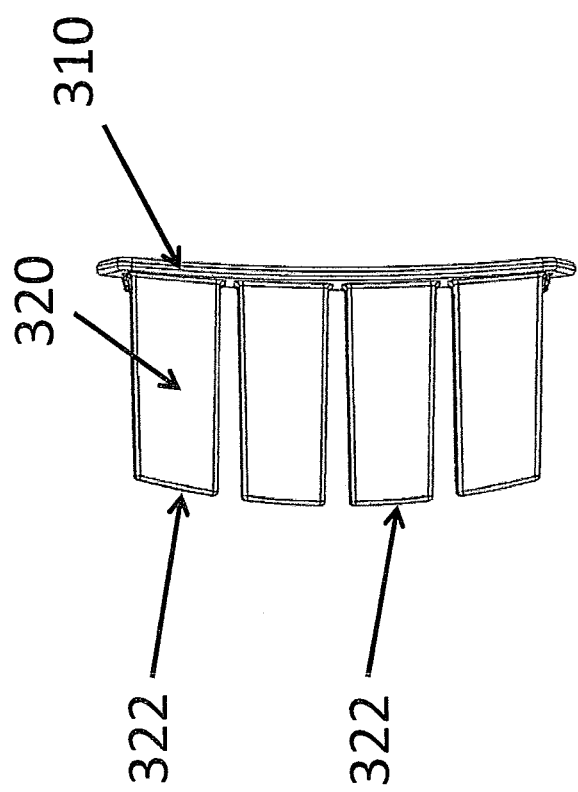
FIG. 7 is a side elevation view of the second part.

As shown in the figures and in accordance with the present invention, at least some of the walls 222, 224, 230 are arcuate shaped blades that are designed so that when the first component 200 is rocked back and forth on the cutting surface, the food is easily cut. In other words and as described herein, to cut food, the first component 200 is inserted into the food and then the first component 200 is rocked back and forth to effectuate a cutting action resulting in the food being cut into individual bite-sized food segments. Each food receiving slot 220 receives one bite-sized food segment. As shown in FIG. 5, the height of the walls 222, 230 is greatest in the middle portion thereof. The end walls 224 can have a uniform height.

In the illustrated embodiment, longitudinal walls, namely, walls 222 and some of walls 230, that extend a length of the first component 200 are the ones that are arcuate shaped and have sharpened bottom edges, while walls that extend along a width of the first component are planar and include sharpened edges.

The handle section 201 is located above the base section 210 and is designed to provide a structure that the user can grasp and manipulate the device 100 and in particular, the first component 200 is held by the handle section 201 at ends 206, 208 thereof and then is directed downwardly into the food. The ends 206, 208 define the ends of the device 100 and extend beyond the base section 210. The width of the handle section 201 can also be greater than the base section 210 and therefore, the handle section 201 effectively extends beyond the sides and ends of the base section 210.

The handle section 201 has an upward lip or flange 260.

The second component 300 acts as pusher and discharges the bite-sized portions that are cut and collected in the slots 220 of the first part 200. The second component 300 is therefore designed to complement and mate with the first component 200. More specifically, the second component 300 is generally in the form of a pusher that mates with the base section 210 for ejecting the food that is received within the food receiving slots 220.

The second component 300 includes a base section 310 and a plurality of protrusions or fingers 320 that extend outwardly form the base section 310. The base section 310 also serves as a handle portion that allows the user to easily grasp the second component 300 and insert it into the base section 210. The number of fingers 320 is preferably equal to the number of food receiving slots or spaces 220. The fingers 320 thus descend downwardly from the base section 310.

Figure 8:
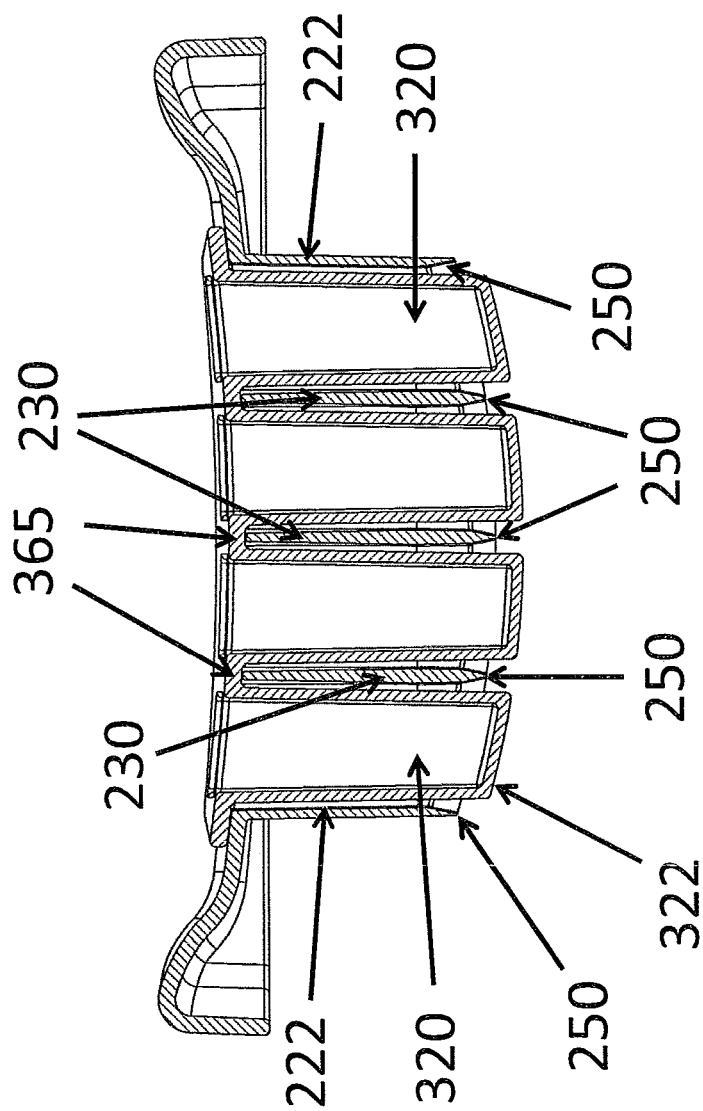
FIG. 8 is a cross-sectional view of the device of FIG. 1 in an assembled position.

As shown in FIG. 8, walls 365 that are located between the fingers 320 at the top ends thereof seat against the top edges of the walls 230 so as to limit the movement of the second component 300.

The fingers 320 are thus elongated structures that have closed bottom ends 322. In the illustrated embodiment, the fingers 320 are generally square shaped and are complementary to the food receiving slots 220 so that when the fingers 320 are received within the slots 220, a snug, frictional fit can result or a slight space can be formed between therebetween. In other words, the walls of the fingers 320 can seat against the walls that define the slots 220. As shown, the closed bottom ends 322 are non-parallel and can be arcuate shaped. The ends 322 thus mirror the arcuate nature of the walls of the base section 210.

Figure 2:
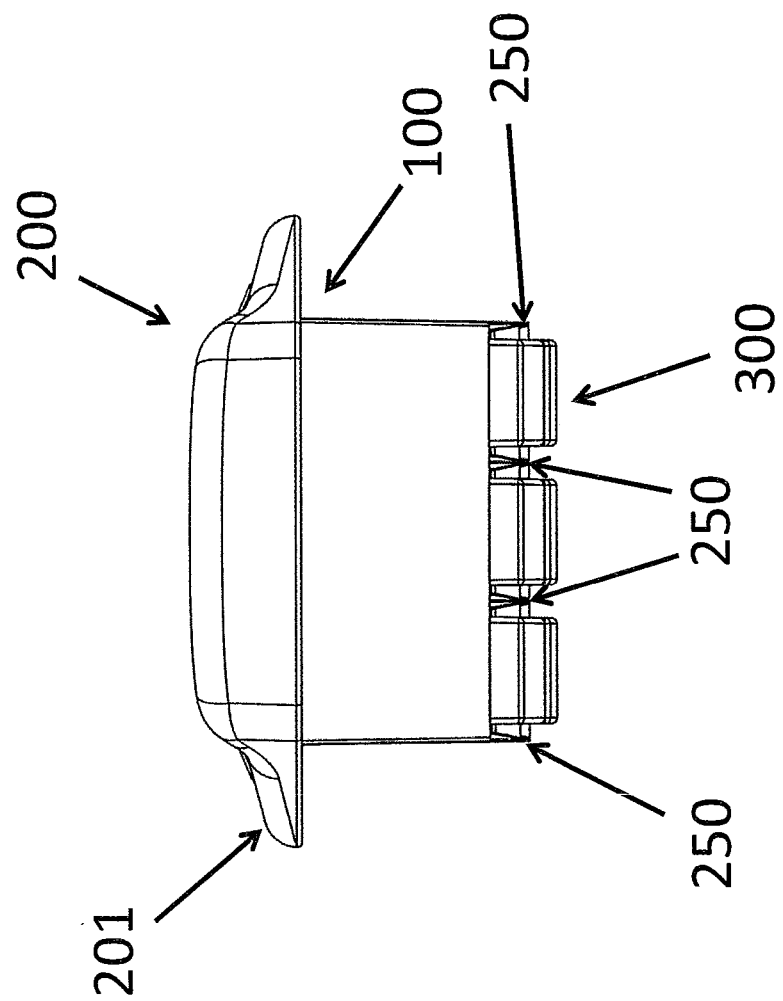
FIG. 2 is an end view of the assembled device of FIG. 1.
Figure 3:
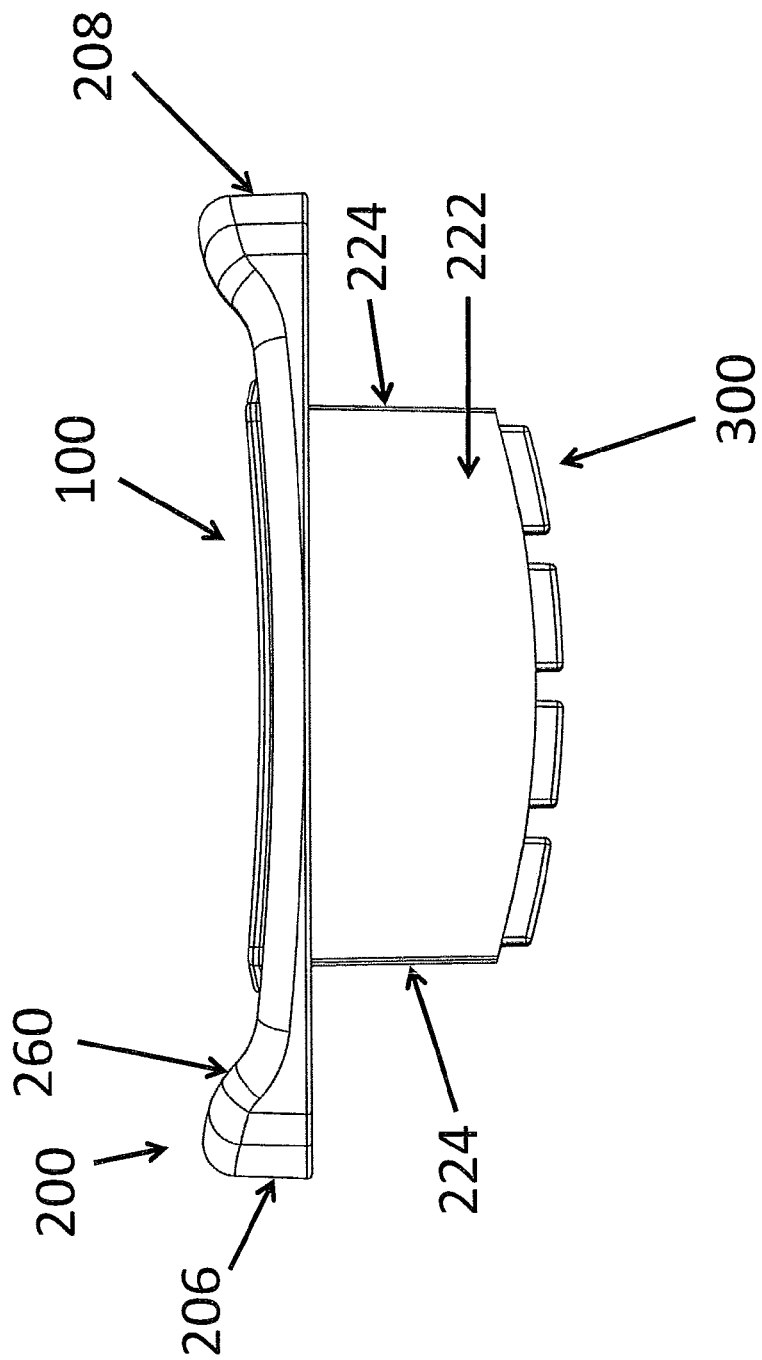
FIG. 3 is side elevation view of the assembled device of FIG. 1.

The spacing between the fingers 320 is selected so that the walls 230 can be received therebetween when the fingers 320 are inserted into the open food receiving slots 220 as shown in FIG. 2.

The heights of the fingers 320 are preferably greater than the height of the base section 210 since when the first and second components 200, 300 mate together, the fingers 320 extend below the bottom edges of the base section 210 as shown in the figures. This allows the fingers 320 to eject any food (i.e., the bite-sized food segments) that is disposed within the food receiving slots 220.

The base section 310 is received on a platform 255 of the handle section 201 when the second component 300 is fully inserted into the first component 200.

The fingers 320 can be open along the base section 310. In other words, the fingers 320 can be hollow since the fingers 320 only need to have closed bottom ends 322 to eject the food that is contained within the food receiving slots 220.

The operation of the device 100 is now described. First, the food is cut by inserting the bottom edges of the first component 200 into the food and a cutting force is applied by directing the first component 200 into the food. A rocking (side-by-side) movement can be undertaken to cause cutting of the food into the bite-sized food segments. The walls 222, 224, 230 define the shape of the food receiving slots 220 and thus, the bite-sized food segments can be formed to have any number of different shapes, such as fun or decorative shapes, such as a triangle or star or heart, an outline of a character or animal, such as a fish, etc. The first component 200 can also be designed so that it provides tessellations for shapes or tangram puzzle comprising a variety of different shapes that when combined can create a repeating pattern or larger shape.

Once the bite-sized food segments have been cut and collected in the slots 220, the second component 300 is then inserted into the open tops of the food receiving slots 220 and the fingers 320 are driven within the food-receiving slots 220 into contact with the captured (collected) food. As the fingers 320 are driven forward, the food is ejected out of the open bottom ends of the food receiving slots 220. The ejected bite-sized food segments have fun shapes and promote trying new foods and eating healthier food.

Figure 4:
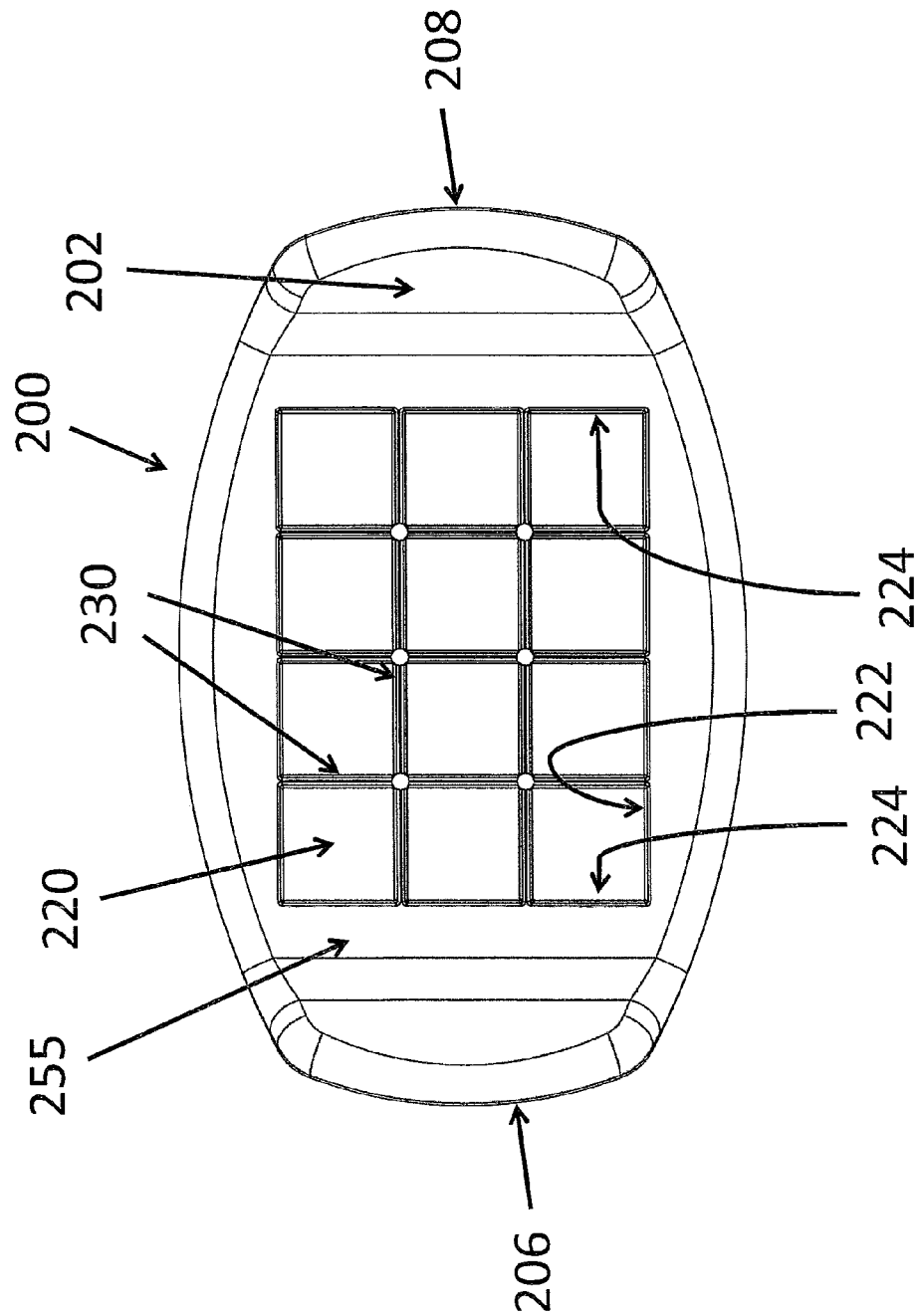
FIG. 4 is a top plan view of a first part of the device.

In the illustrated embodiment, the base section 210 has a generally rectangular block-like structure; however, other shapes are equally possible. In FIG. 4, each food receiving slot 220 has a square shape and there is an array of food receiving slots 220. For example, there can be food receiving slots 220 of different shapes like triangles, circles, semi-circles, heart, fish, stars, etc. along the length of the base section 210 as measured in the direction of ends 206, 208.

The second component 300 can also be designed to imprint/stamp impressions on top of food pieces by using the fingers 320. In this case, the closed ends 322 of the fingers 320. The bottom of the closed ends 322 of the fingers 320 can thus have an imprinted shape or the like that can be used to imprint a shape or the like onto the food.

FIGS. 9-13 shows an alternative device 400 that is similar to device 100 and therefore, similar or like elements are numbered alike. In this device 400, there are a plurality of shaped food-receiving slots 405. It will be appreciated that unlike the first embodiment, the device 400 includes food-receiving slots 405 that are not uniform throughout the entire device 400. Within a single device 400, there can be different shaped food receiving slots 405 including both regular shapes and irregular shapes. Each food-receiving slot 405 is formed by a plurality of walls that intersect or are otherwise joined to define the food-receiving slot 405.

The device 400 includes a first component 410 that has many of the same characteristics as the first component 200, such as a plurality of food-receiving slots 405, base section 412 and a handle section 414. As in the first embodiment, the walls that define the base section 412 include sharpened ends 415 (cutting edges). The cutting edges 415 are formed along the bottom edges of the walls that define the base section 412 and represent the portions of the base section 412 that come into contact with the food.

As in the first embodiment, the food-receiving slots 405 define the shapes that the food is cut into and as will be appreciated with reference to FIGS. 9-13, the food-receiving slots 405 have non-uniform shapes in that the base section 412 include a plurality of differently shaped food-receiving slots 405. The shape and size of the food-receiving slots 405 can vary and it will be appreciated that at least two of the food-receiving slots 405 can be identical.

It will further be appreciated that two or more food-receiving slots 405 can be combined to define a larger shaped slot. For example, in the illustrated embodiment, a plurality of food-receiving slots 405 can be strategically shaped and located so as to define a large heart shape as shown. As illustrated, a series of triangular shaped food-receiving slots 405 and arcuate shaped food-receiving slots 405 are arranged to define a large heart shaped food-receiving slot.

It will be appreciated that the present invention is not limited to only be in the form of heart shapes; however, the present invention covers the principle of combining a number of individual food-receiving slots 405 to define a greater sized shaped.

In addition, as shown, one of the food-receiving slots 405 that is separate and does not form the larger shaped slot can have the same shape as the larger shaped slot. For example, as shown, the larger shaped slot is in the form of a heart that is formed of a number of separate food receiving slots (none of which individually is heart shaped) that when combined form the heart.

In addition, the device 400 also includes a second component (pusher) 450 that has a base section 460 with fingers 470 extending therefrom that are received into the food-receiving slots 405 and ejects the captured (collected) food in the same manner discussed above with reference to the other embodiment. The pusher 450 is constructed similar to the first component 410 in that at least some of the walls of the pusher 450 have arcuate shaped bottom edges to allow a rocking motion of the device 400 as described herein.

Figure 9:
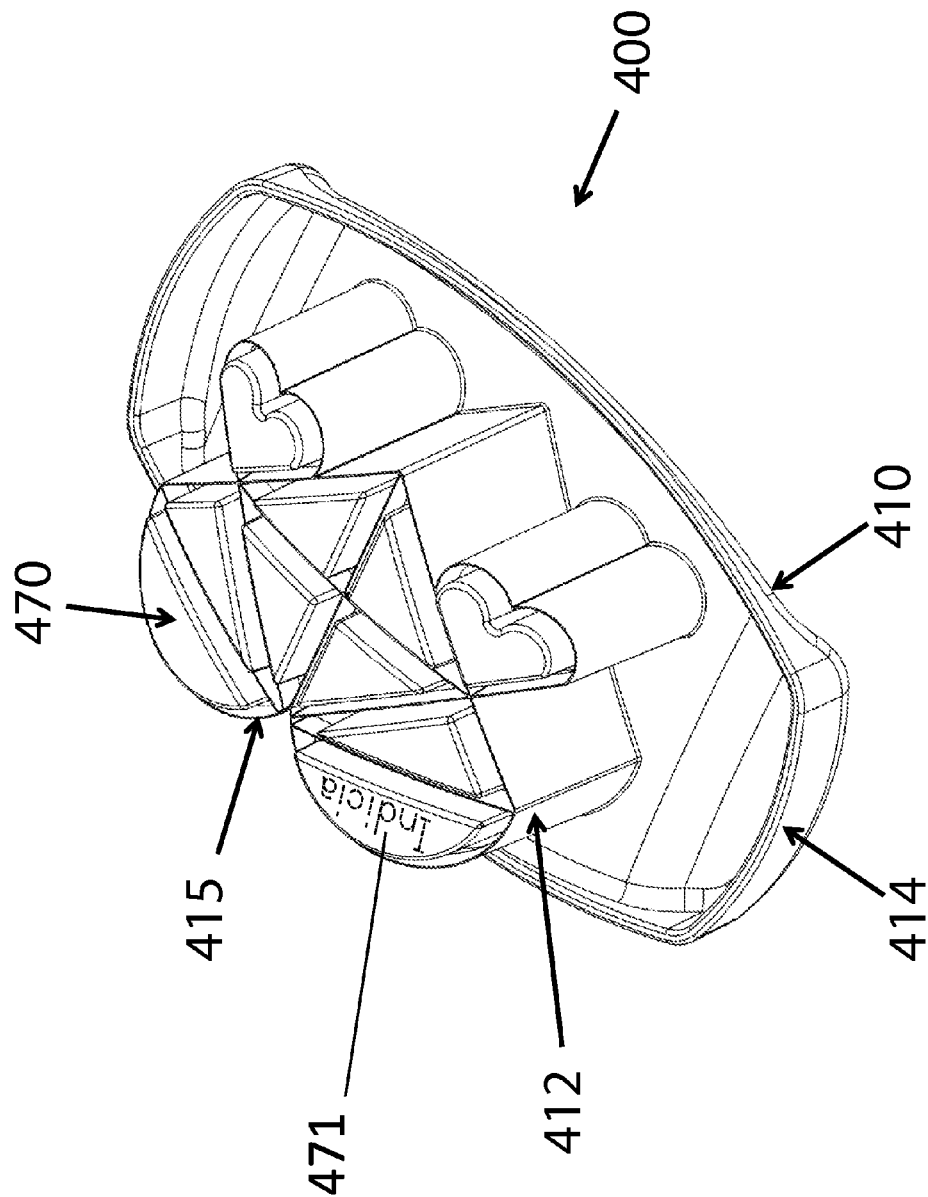
FIG. 9 is a bottom and side perspective view of a food cutter device according to another embodiment.
Figure 10:
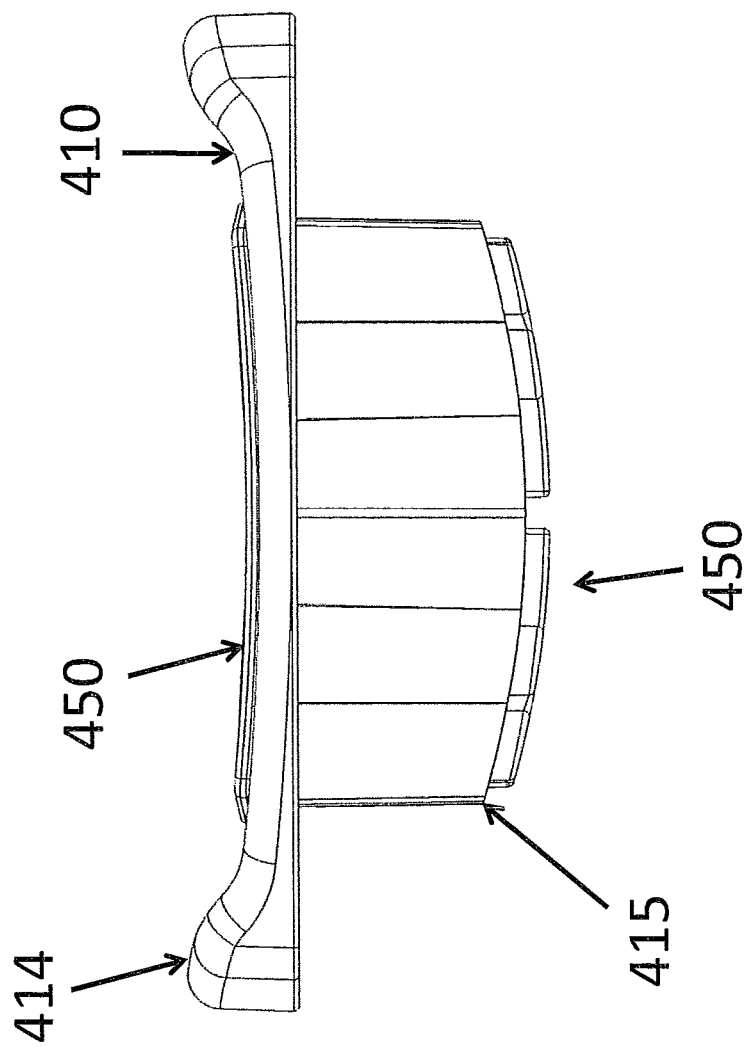
FIG. 10 is a side elevation view of the food cutter device of FIG. 9.

FIGS. 9 and 10 show the device 400 in a fully assembled position in which the pusher 450 is inserted into the food-receiving slots 405. As in the first embodiment, it will be seen in FIG. 10 that when assembled, the pusher 450 extends below the cutting edges of the first component 410. As shown in FIG. 9, the closed bottom ends of one or more fingers 470 can include imprint indicia 471. In FIG. 9, the word "indicia" represents the imprint indicia that can be formed on the closed bottom ends of the fingers 471 for transferring such imprint indicia to the food.

Figure 11:
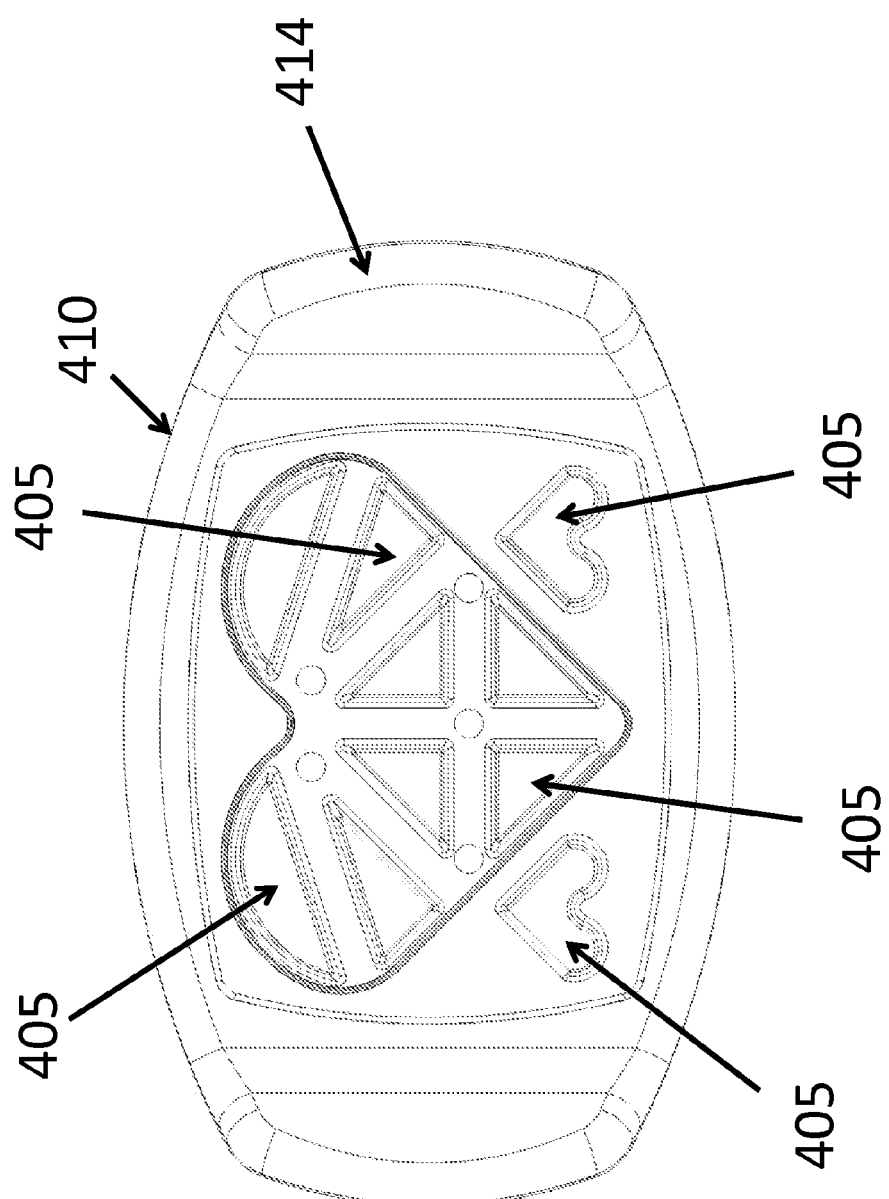
FIG. 11 is a top plan view of a first part of the device of FIG. 9.
Figure 12:
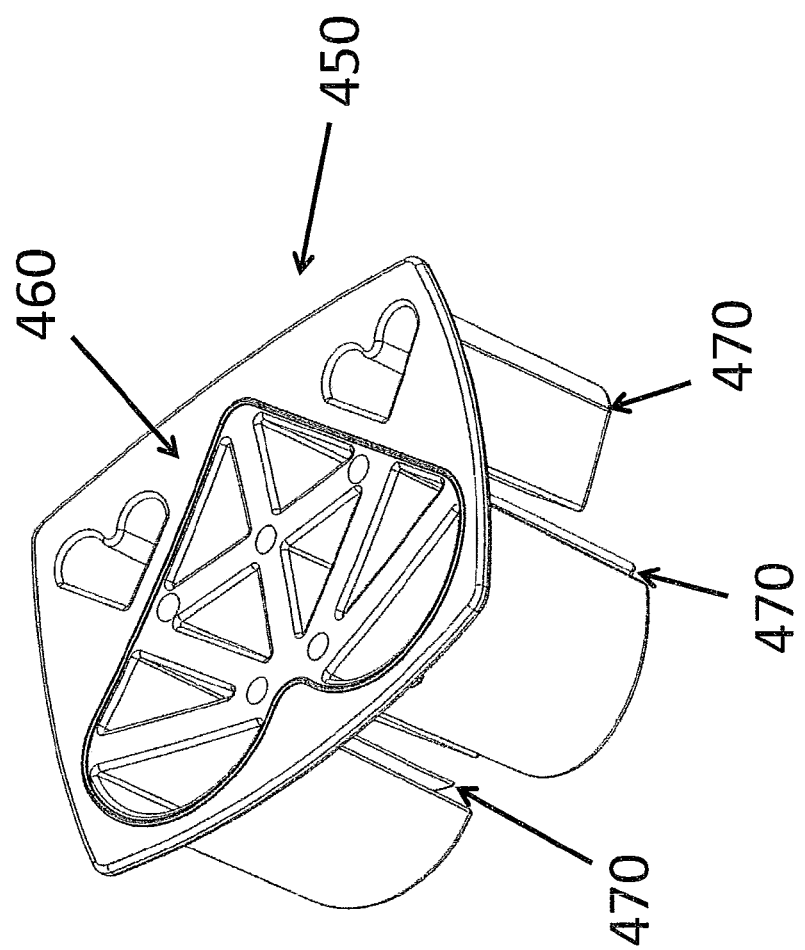
FIG. 12 is a top and side perspective view of a second part of the device of FIG. 9.

FIG. 11 shows the first component 410 and FIG. 12 shows the second component 450 with the fingers 470. The fingers 470 are thus shaped to be disposed within the different shaped food-receiving slots 405 and therefore, as shown, there are arcuate shaped fingers 470, triangular shaped fingers 470, and two smaller heart shaped fingers 470 in the embodiment of FIG. 12. However, the fingers 470 are separate from one another and thus, small spaces are formed between the fingers 470.

Figure 13:
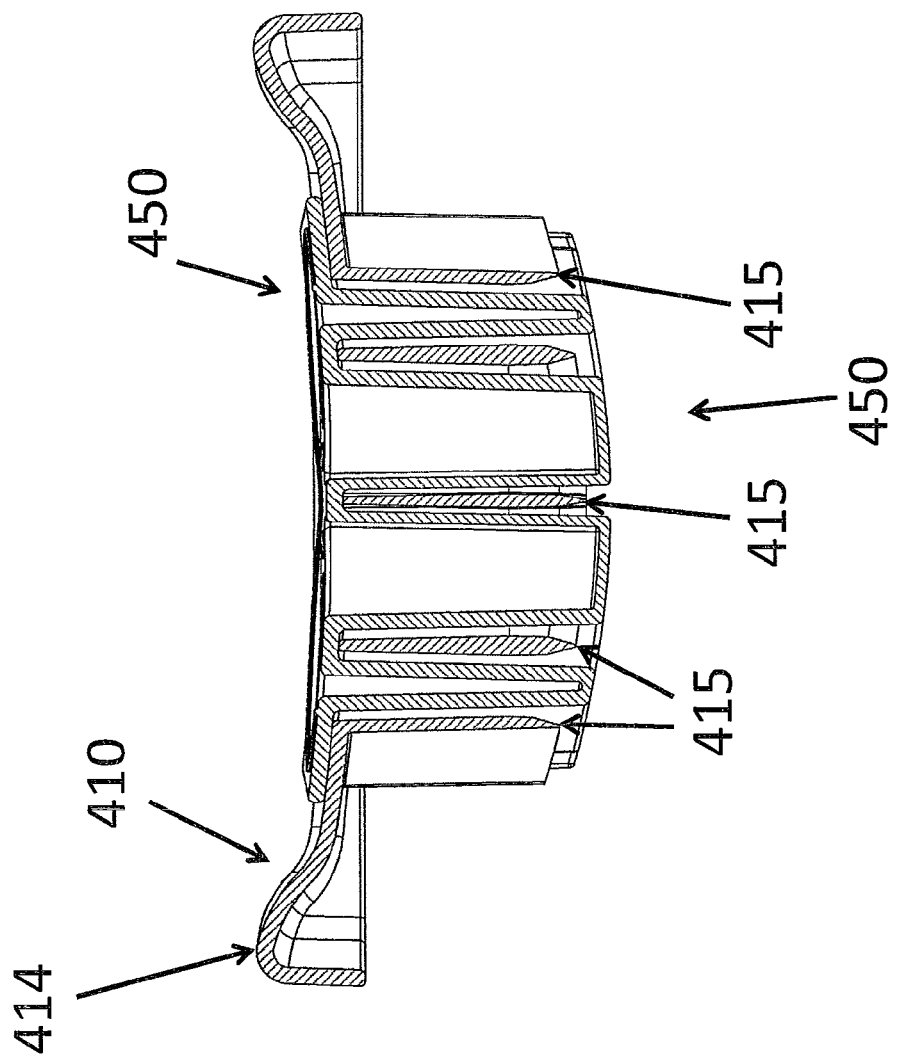
FIG. 13 is a cross-sectional view of the device in FIG. 9 in the assembled state.

FIG. 13 is a cross-sectional view showing the first and second components 410, 450 mated together with the second component 450 extending below the cutting edges of the first component 410. The pusher can also have imprinted surfaces as discussed above with reference to the first embodiment.

Figure 14:
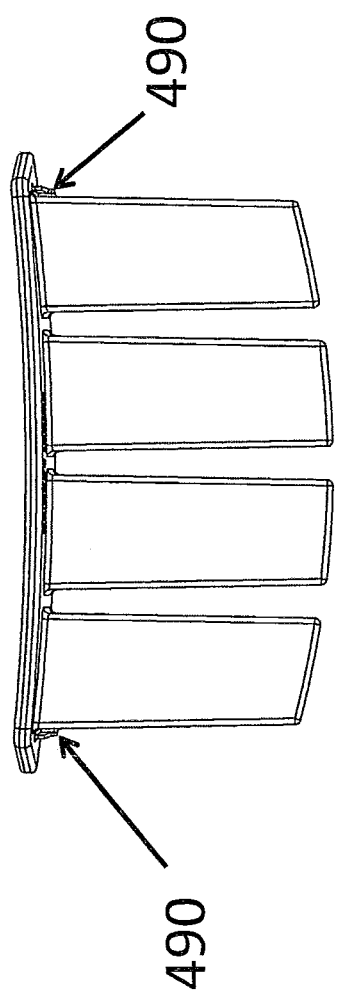
FIG. 14 is a cross-sectional view of a second part showing a locking mechanism.

FIG. 14 shows a locking mechanism that is part of the second part (pusher). In particular, the pusher can include a plurality of locking tabs or protuberances (tabs) 490 that protrude outwardly from the body of the pusher. In the illustrated embodiment, there are four protuberances 490 with two on each side of the pusher body. The protuberances are located near the top of the pusher adjacent and integral to select fingers of the pusher. When the pusher is fully inserted into the first part/component, the protuberances 490 frictionally seat against the walls of the first component so as to form a frictional fit between the two components. Thus, the two parts are mechanically coupled to one another yet can be detached when an appropriate force is applied.

It will be appreciated that the larger shaped food cut out is formed of and provides various bite-sized food shapes that can be individually eaten. The walls of the individual shapes within the heart are shared by different smaller shapes like triangles and semi-circles. When these pieces are popped out the pieces, when combined, create a larger puzzle-like shape of a heart in that the heart shaped food cut out is only obtained when all of the individual pieces are properly combined.

In one embodiment of the present invention, the assembled unit has a length of about 6.0 inches and a width of about 3.75 inches and a height of about 1.5 inches. The food receiving slot 320 is a square that has sides of about 0.75 inches in length. However, it will be appreciated that the devices of the present invention can be formed in any number of sizes and the components can be formed of a number of different materials. However, it is preferred for the parts to be formed of a high-performance engineering plastic (e.g., molded plastic parts).

It will be appreciated that while the figures show uniform food receiving slots and fingers, each of the first and second components can be formed to have multiple shapes. For example, the food receiving slots of the first component can include a any pattern (e.g., diamond, triangles, semi-circles, hearts and star shapes) of shapes and similarly, the fingers of the second component are complementary. The shapes can be singular and the same as with the 12 square cutter or a composition of many shapes to create a larger shape or design. The shapes could also be a repeating pattern or tessellation.

In addition, the process of making the smaller portions from the overall larger portion (entrée) is part of the overall plan for making eating healthy food less stressful, more fun and enjoyable. The devices disclosed herein can be used on most kid friendly food from simple foods, such as bread and cheese to pancakes, pizza, fish, quesadilla, sandwiches and chicken. It is made of high performance material for strength, durability and sharpness. The present device works on hard surfaces such as a plate, cutting board or countertop and is top shelf dishwasher safe. The present device alleviates the need for the parent to spend significant time cutting kid's food into bite-sized pieces. Further, children love the bite-sized fun offered by the present product. Not only is the meal nutritious but now it is much more fun to eat. The present device is thus of the type that permits the parent to supply and make the food and let the device provide the fun and watch a child eat more nutritious food as a result of the fun sized bite-sized food, as well as the use of the device that makes the overall eating experience less stressful and more fun for everyone.

While the invention has been described in connection with certain embodiments thereof, the invention is capable of being practiced in other forms and using other materials and structures. Accordingly, the invention is defined by the recitations in the claims appended hereto and equivalents thereof.

What is claimed is:

1. A kit for cutting and separating food into bite-sized portions comprising:

a first component that includes a base section having a plurality of individual, separate food-receiving slots that are defined by a plurality of cutting walls and are completely bounded and open at both ends thereof, wherein the cutting walls comprise a set of first walls and a set of second walls, wherein the set of first walls extend lengthwise in a longitudinal direction between vertical end walls that are an outermost pair of walls of the set of second walls, the set of second walls extending widthwise and intersecting at least some of the first walls, wherein at least each of the first walls has an arcuate convex shaped bottom edge that is beveled for cutting the food, wherein the arcuate shape of the bottom edge is formed in the longitudinal direction between the vertical end walls of the base section which are opposite one another, wherein bottom edges of the second walls are V-shaped cutting edges and bottom edges of the vertical end walls only are beveled along an inner surface thereof which faces toward the opposite vertical end wall, each of the first walls having a maximum height, as measured between the bottom edge and a top edge, in a central portion thereof and a lesser height at the opposite vertical end walls so as to form the arcuate shape along the bottom edge thereof and to cause the central portion to be a bottommost portion of the first component, the first component further including a handle that extends beyond the base section for grasping, each of the food receiving slots being formed to have a predetermined shape, wherein the handle defines a ledge that is formed about and adjacent food receiving slots of the base section; and a second component, separate from the first component, that includes a plurality of fingers that have closed bottom ends, the fingers being sized and shaped to be received within the individual, separate food-receiving slots in a fully inserted position for ejecting food that has been cut by the first component and is contained in the food receiving slots, wherein the second component includes an upper base section from which the fingers extend, the base section extending radially beyond the fingers so as to define a peripheral lip that seats against the ledge in the fully inserted position, wherein heights of end sections of the handle are greater than a height of the peripheral lip so as to shield the peripheral lip in the fully inserted position, wherein heights of the fingers are greater than heights of the food receiving slots such that in the fully inserted position, the closed bottom ends of the fingers extend below the first component to ensure ejection of the food and to shield beveled sections of the bottom edges of the vertical end walls and the first and second walls.

2. The kit of claim 1, wherein each of the first and second components comprises a molded plastic member.

3. The kit of claim 1, wherein ends of the second walls terminate at a pair of outermost walls of the set of first walls which define sides of the base section and are formed perpendicular to the vertical end walls.

4. The kit of claim 1, wherein the handle includes a central platform between handle end portions on which the second component rests, the central platform including the ledge.

5. The kit of claim 1, wherein the fingers of the second component are arranged in an array.

6. The kit of claim 1, wherein the bottom ends of the fingers each has an arcuate convex shape.

7. The kit of claim 1, wherein the fingers are hollow structures open at tops thereof opposite the closed bottom ends.

8. The kit of claim 1, wherein a bottom surface of the closed bottom end of the finger includes imprint indicia for transferring to food.

9. The kit of claim 8, wherein the imprint indicia has a shape different than the predetermined shape of the food-receiving slot.

10. The kit of claim 1, wherein a first set of food-receiving slots define, in combination, a larger shaped food cut out.

11. The kit of claim 10, wherein at least one food receiving slot that is separate from and does not define a portion of the larger shaped food cut out has a same shape as the larger shaped food cut out.

12. The kit of claim 10, wherein each of the food-receiving slots that belong to the first set has a different shape than the larger shaped food cut out.

13. The kit of claim 10, wherein the food-receiving slots of the first set include two or more differently shaped slots.

14. The kit of claim 1, wherein the second component includes a plurality of locking tabs that frictionally seat against walls of the first component when the two are mated together so as to mechanically couple the two together.

* * * * *